United States Patent [19]

Kühner et al.

[11] Patent Number: 5,521,588
[45] Date of Patent: May 28, 1996

[54] METHOD AND APPARATUS FOR PROGRAMMING MOTOR VEHICLE CONTROLS

[75] Inventors: Thilo Kühner, Remseck; Regnerus Nieuwenhuizen, Waiblingen; Claas Bracklo, Stuttgart, all of Germany

[73] Assignee: Mercedes-Benz AG, Germany

[21] Appl. No.: 240,518

[22] Filed: May 10, 1994

[30] Foreign Application Priority Data

May 10, 1993 [DE] Germany .................. 43 15 494.8

[51] Int. Cl.$^6$ ................................................. H04Q 1/00
[52] U.S. Cl. ......................... 340/825.22; 364/245.2
[58] Field of Search ................... 540/825.22, 825.52; 364/518, 245.2

[56] References Cited

U.S. PATENT DOCUMENTS

| | | | |
|---|---|---|---|
| 4,970,636 | 11/1990 | Snodgrass | 364/518 |
| 4,982,185 | 1/1991 | Holmberg | 340/825.52 |
| 5,138,548 | 8/1992 | Kienle | 364/245.2 |

FOREIGN PATENT DOCUMENTS

| | | |
|---|---|---|
| 0266704 | 5/1988 | European Pat. Off. . |
| 3624456A1 | 1/1988 | Germany . |
| 4128922A1 | 3/1992 | Germany . |

*Primary Examiner*—Brian Zimmerman
*Attorney, Agent, or Firm*—Evenson, McKeown, Edwards & Lenahan

[57] ABSTRACT

Method and apparatus for programming at least one control device in a vehicle having a plurality of control devices to be programmed, and a central control device with a non-volatile vehicle configuration memory. A bus system connects all the control devices in the vehicle to one another and to the central control device. When one of said control devices is retrofitted or replaced, it initiates a comparison of data located in its memory with the vehicle configuration data resident in the configuration memory of the central control device and, in the case of differences between these data, the data in the retrofitted or replaced control device are overwritten with current vehicle configuration data called up from the vehicle configuration memory.

7 Claims, 1 Drawing Sheet

METHOD AND APPARATUS FOR PROGRAMMING MOTOR VEHICLE CONTROLS

BACKGROUND AND SUMMARY OF THE INVENTION

The invention relates to an apparatus and a method for programming at least one control device for a motor vehicle.

German Patent Document DE 36 24 456 discloses an electronic system for a motor vehicle having a plurality of local electronic controls for various vehicle systems. The local controls which are associated with several systems, and contain correspondingly different program steps and fixed variables, are connected to a central control unit which actuates them when the motor vehicle is started up, and/or at regular intervals, and selects program steps and fixed variables associated with the respective assemblies.

The central control unit, which may be a part of one of the local control devices, can be encoded externally in accordance with the vehicle type. By means of the central control unit, the assignment of a particular local control to the vehicle-specific assembly is thus effected individually, it being possible for the fixed variables and program steps which are identical for several vehicle types to remain unaffected. Thus, such fixed variables and program steps can be provided in resident form in corresponding control devices to a certain extent as frame firmware.

German Patent Document DE 41 28 922 A1 describes, inter alia, a programming arrangement for electronic controls in a vehicle in which the type of vehicle which is, for example, being manufactured and its equipment are detected by means of an identification system, and corresponding vehicle configuration data are prepared and read in from an external programming device into a vehicle control device. The external programming device communicates with a host computer which is also external in order to prepare the programming data for the control device in each case in a vehicle-specific fashion.

The object of the present invention is to provide a method and apparatus for programming at least one motor vehicle control which is to be retrofitted or replaced, which method and apparatus achieve the simplest, most reliable and effective possible programming of such a control device.

This object is achieved according to the invention by a programming arrangement based in a vehicle having a plurality of local control devices which are connected to a central control device, and can communicate with one another (and with the central control device) via a bus system, even before their original programming.

A control program for distributing configuration data via the bus system, and for loading configuration data out of the vehicle configuration memory into the local control devices, is resident in the central control device, and each of the control devices is equipped with a bus function for receiving, selecting and storing vehicle configuration data distributed to it. The vehicle configuration data can be transmitted via the bus system to the individual control devices and stored there, at least by initialization of the control program, which is resident in the central control device.

According to the invention, at least one motor vehicle control device which is to be retrofitted or replaced is supplied with continuous electric power even when the vehicle is stationary however, its memory (which receives vehicle configuration data) is cleared when the control device is removed from the vehicle. Furthermore, such control device contains a separate, resident control program which can detect an electronic "non-programmed" marker (or can detect an empty state of its volatile memory as such a marker) and the control device automatically transfers the vehicle configuration data required by the central control device out of the vehicle configuration memory of the central control device, via the bus, and stores them in a volatile fashion.

In comparison with conventional arrangements for individual selective reprogramming of control devices to be refitted or replaced, this arrangement eliminates the need to maintain additional equipment in garages for configuration or reprogramming of replaced or retrofitted control devices. At the same time, it also dispenses with the problems associated, for example, with highly stressed plug-in contacts between vehicle and such external additional devices.

The method according to the invention permits one or more motor vehicle control device to be programmed in a motor vehicle which contains a plurality of such control devices connected to communicate with one another via a bus. One of the control devices which has a central function is equipped with a non-volatile vehicle configuration memory in which information relating to the type of the vehicle, its equipment and the type and number of control devices which are present in the vehicle, can be stored. According to the invention, such programming is performed in the case of retrofitting or of replacement of one or more of the control devices, by the following steps:

Initialization is performed by comparing data stored in the memory of the retrofitted or replaced device(s) with the vehicle configuration data stored in the configuration memory of the central control device; and In the case of differences in these data, the data in the newly added or replaced control device are overwritten with current vehicle configuration data called up from the vehicle configuration memory.

During a subsequent replacement or addition of a control device, its initial programming or reprogramming in the vehicle can therefore be performed directly out of the vehicle configuration memory of the central control device, without external support, under the control of the newly installed control device, which is characterized as "not yet programmed."

Other objects, advantages and novel features of the present invention will become apparent from the following detailed description of the invention when considered in conjunction with the accompanying drawings.

DETAILED DESCRIPTION OF THE DRAWINGS

Figure 1:
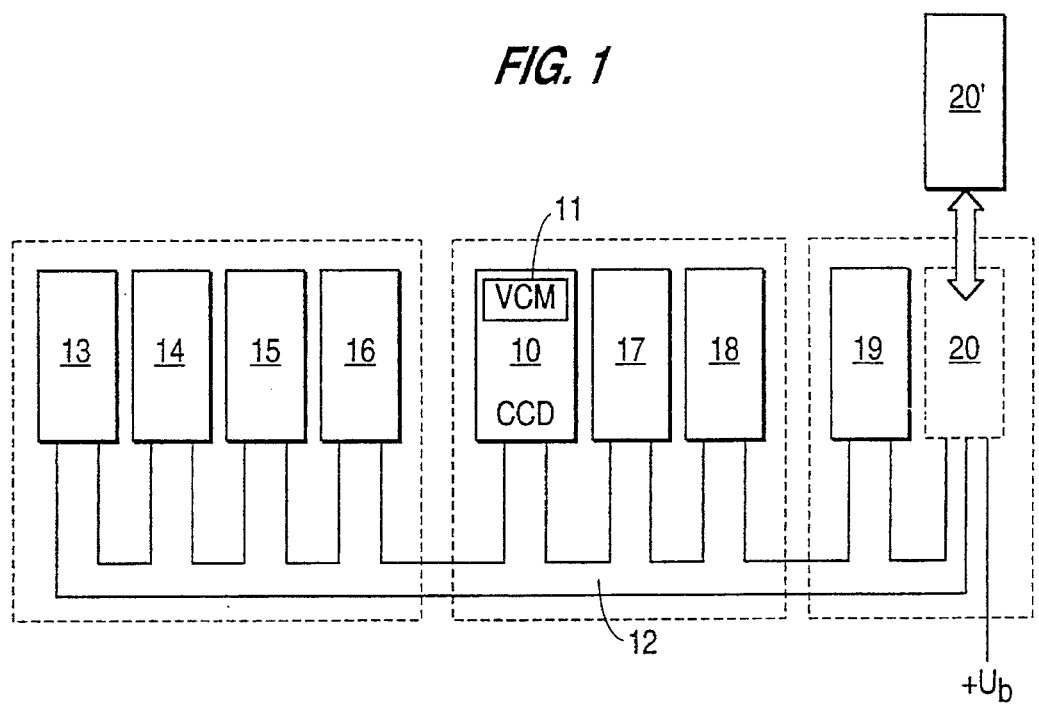
FIG. 1 is a block circuit diagram of a first exemplary embodiment of the arrangement.

According to FIG. 1, a central control device 10, which is always present irrespective of the individual equipment of the vehicle, contains a non-volatile vehicle configuration memory 11. The central control device 10 is connected to all the other vehicle control devices 13 to 16, 17 and 18 as well as 19 and 20 via a bus 12.

The control devices 13 to 16 can be, for example, engine management controls; while the central control device 10 and the control devices 17 and 18 may be passenger compartment controls; and the control devices 19 and 20 may control independent functions, for example, a parking aid, air bags, ventilation, etc. The bus system may be, for example, a two-wire serial bus (according to the CAN standard) or an optical bus.

The vehicle configuration memory 11 in the central control device 10 is of the non-volatile type, preferably a programmable ROM (EPROM, EEPROM, FLASHPROM, etc.). However, for standard equipment a mask-programmed ROM is equally useful.

The memories of the local control devices 13 to 16, 17 and 18 and 19 and 20 can also be non-volatile EPROMs, EEPROMs, FLASHPROMs, etc. In this case, vehicle configuration data are stored in a control device 20' which can be removed from the vehicle; that is to say that such data could be read out.

If it is not possible for the local control devices to have EPROMs, etc., in order for example to permit a control device to be freely replaced without difficulty, it may otherwise contain only a volatile RAM for receiving configuration data and a resident control program for requesting and connecting (via the bus 12) configuration data from the central control device 10 and loading them into the separate RAM. At least the RAM memory of such a control device is continuously supplied with power from a voltage source (not shown), for example from terminal THIRTY ($+U^b$) in the vehicle which always provides the voltage of the vehicle's electrical system independently of the ignition lock switch. As a result, a "quasi-resident" storage is possible which continues as long as the control device is left in its connection position in the vehicle and its continuous voltage supply is maintained.

In their newly installed state, the local control devices 13 to 16, 17 and 18, 19 and 20 and 20' respectively may have for example, an electronically readable "non-programmed" marker, which causes the resident control program of the central control device 10 to transfer data from its vehicle configuration memory 11 to the local control devices which are so marked for storage there. In this case, such storage can be resident or "quasi-resident." In the case of quasi-resident storage, the control program of a local control device can detect as an activation criterion a previously specified state of its RAM memory after disconnection of the power. That is, in particular, the result of a contents interrogation of the RAM during testing will show that it is empty.

The non-volatile vehicle configuration memory 11 can be installed in an insertable, replaceable or permanent fashion in the central control device at any time by suitable plug-in attachment; within the scope of the invention, all conventional possible ways of non-volatile storage of the vehicle configuration data in the central control device are therefore conceivable.

Figure 2:
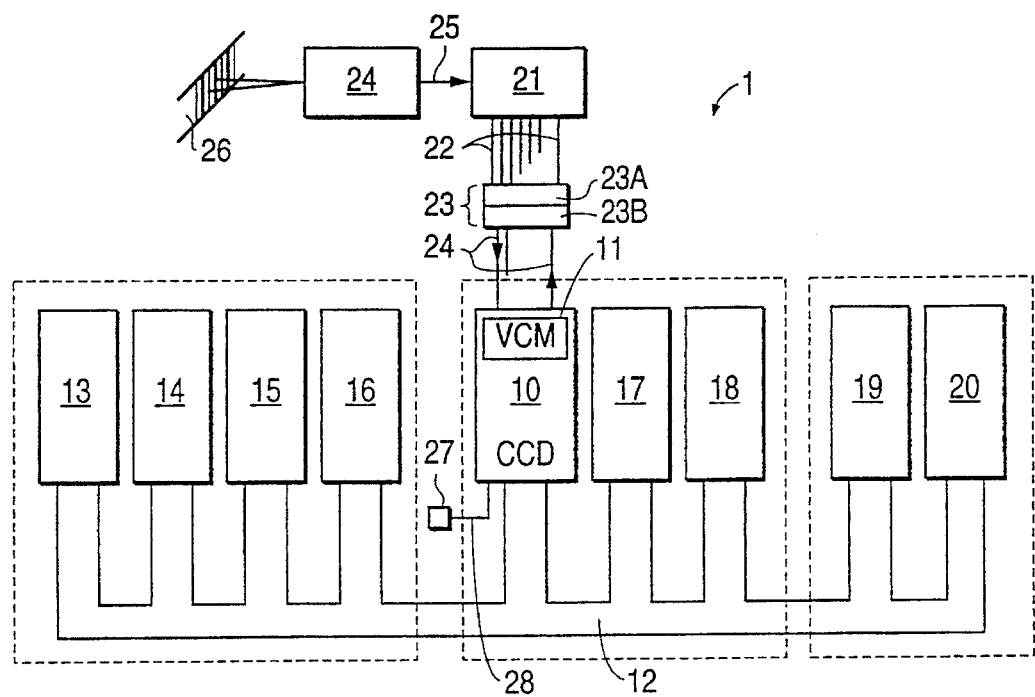
FIG. 2 is a block circuit diagram of a second exemplary embodiment of the arrangement.

FIG. 2 shows another embodiment of the invention in which externally stored information is read and entered into the central control device 10. Here, the central control device 10 is assigned a vehicle configuration memory 11 which is preferably permanently installed. The central control device 10 is connected via a transmission/reception path 24 to the part 23B of a plug-in connection 23 which is fixed to the vehicle. The other part 23A of the plug-in connection 23 is connected via lines 22 to an external test device 21 which can be connected in turn via a data line 25 to a reader unit 24 which reads information concerning the type of vehicle and the devices with which it is equipped from a data carrier 26 assigned to the vehicle during manufacturing, and transfers such data into the test device 21.

The vehicle configuration memory 11 here is also preferably of the non-volatile type; and the connections 22 and 24 can be electric, optical or a mixture of electric and optical. The arrangement is designed so that the non-volatile entry of configuration data into the vehicle configuration memory 11 preferably takes place in a preceding step, independently of the programming of the other control devices.

According to FIG. 2, the arrangement may also include a key or a switch or an instruction transmitter 27 to the central control device 10. The key or the like can be activated via a safety device (not shown) in the vehicle or at the central control device 10, whereupon the central control 10 calls up the local control devices 13 to 20 connected to the bus and compares configuration data stored in the individual local control devices with that contained in the vehicle configuration memory 11. In the event that such data do not correspond, the data in the control devices 13 to 20' are overwritten with the current vehicle configuration data.

In this embodiment of the invention, control devices are programmed as follows:

Data, stored in a data carrier 26 fixed to the vehicle (relating to the type and number of control devices present in the vehicle) are read out of the test device 21;

These configuration data, or configuration data derived therefrom, are transferred directly to the central control device 10 containing the vehicle configuration memory 11;

The configuration data transferred to the central control device 10 are stored in a non-volatile vehicle configuration memory;

a control program which is resident in the central control device 10 is initialized from the test device 21 to distribute the vehicle configuration data via the bus system and initialize the selective reception of these data by the individual local control devices 13 to 20;

The configuration data selectively received by the local control devices 13 to 20 are written into resident memory areas thereof.

If a certain control device 20 is replaced with a control device 20' during servicing (or in the case of the later installation of one or more new control devices or a control device which originates from another vehicle), such new control device or devices are alternatively programmed to the current vehicle configuration as follows:

A comparison of the data contained in respective memories of the control devices 13 to 20' with the vehicle configuration data resident in the configuration memory 11 of the central control device 10 is initialized from the central control device 10;

If differences are detected, the central control device 10 causes the data in the (newly added or replaced) control device 20' to be overwritten with current vehicle configuration data transmitted from the vehicle configuration memory 11.

Alternatively, corresponding programming can also be performed by the following steps:

A comparison of data stored in the memory of the retrofitted or replaced control device 20' with the vehicle configuration data resident in the configuration memory 11 of the central control device 10 is initiated from the control 20';

If differences are detected, the retrofitted or replaced control device 20' causes the data in the (newly added or replaced) control device 20' to be overwritten with current vehicle configuration data called up from the vehicle configuration memory 11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for programming at least one control device which is retrofitted or replaced, in a motor vehicle having a plurality of local control devices which are coupled in communication with each other and with a central control device contained on one of said local control devices, by means of a data bus, said central control device having a non-volatile vehicle configuration memory with vehicle configuration data concerning control devices and equipment present on the vehicle, and a program for controlling distribution of vehicle configuration data by means of the data bus as well as entry of such data into the local control devices, and each of said local control devices having a bus function for receiving, selecting and storing vehicle configuration data transmitted to said local control devices via the data bus, at least by initialization of the control program, said arrangement comprising:

at least one of said local control devices having volatile memory means for receiving from said central control device vehicle configuration data comprising at least a control program and control parameters to enable said local control device to operate, said volatile memory means erasing its contents when it loses electric power;

means for supplying continuous electric power to said at least one of said local control devices while it remains installed in the vehicle, including when the vehicle is stationary and when the engine is not running; and a separate resident control program contained in said at least one of said local control devices, which resident control program is operative in response to detection of a nonprogrammed state of said volatile memory of said at least one of said local control devices, in which nonprogrammed state said volatile memory contains no vehicle configuration data for said vehicle, and in response to detection of said nonprogrammed state said resident control program initializes the central control device to automatically transfer vehicle configuration data from its vehicle configuration memory, via said data bus, and can store said vehicle configuration data in said volatile memory.

2. Arrangement according to claim 1 wherein said separate control program detects said nonprogrammed state of said volatile memory by detecting a "nonprogrammed marker" generated by said at least one of said local control devices.

3. Arrangement according to claim 1 wherein in said nonprogrammed state, said volatile memory has no configuration data stored therein.

4. Arrangement according to claim 1 wherein:

in said nonprogrammed state, said volatile memory has stored therein configuration data which differ from said vehicle configuration data for said vehicle; and transfer of said vehicle configuration data from the vehicle configuration memory to the volatile memory of said at least one local control devices is performed in response to detection of a difference between said vehicle configuration data stored in said vehicle configuration memory and said configuration data stored in said volatile memory of said at least one of said local control devices.

5. Arrangement for programming at least one control device which is retrofitted or replaced, in a motor vehicle having a plurality of local control devices which are coupled in communication with each other and with a central control device contained on one of said local control devices, by means of a data bus, said central control device having a non-volatile vehicle configuration memory with vehicle configuration data for control devices and equipment present on the vehicle, and a program for controlling distribution of vehicle configuration data by means of the data bus as well as entry of such data into the local control devices, and each of said local control devices having a bus function for receiving, selecting and storing vehicle configuration data transmitted to said local control devices via the data bus, at least by initialization of the control program, said arrangement comprising:

at least one of said local control devices having volatile memory means for receiving from said central control device vehicle configuration data comprising program steps and fixed variables to enable said local control device to operate, said volatile memory means erasing its contents when it loses electric power;

means for supplying continuous electric power to said at least one of said local control devices while it remains installed in the vehicle, including when the vehicle is stationary and when the engine is not running; and a separate resident control program contained in said at least one of said local control devices, which resident control program is operative in response to detection of a nonprogrammed state of said volatile memory of said at least one of said local control devices, in which nonprogrammed state said volatile memory contains no vehicle configuration data for said vehicle, and in response to detection of said nonprogrammed state said resident control program initializes the central control device to automatically transfer vehicle configuration data from its vehicle configuration memory, via said data bus, and can store said vehicle configuration data in said volatile memory.

6. Method for programming at least one control device which is retrofitted or replaced, in a motor vehicle having a plurality of local control devices which are coupled in communication with each other and with a central control device contained on one of said local control devices, by means of a data bus, said central control device having a non-volatile vehicle configuration memory with vehicle configuration data for control devices and equipment present on the vehicle, and a program for controlling distribution of vehicle configuration data by means of the data bus as well as entry of such data into the local control devices, each of said local control devices having a bus function for receiving, selecting and storing vehicle configuration data transmitted to said local control devices via the data bus, at least by initialization of the control program, and at least one of said local control devices having volatile memory means for receiving from said central control device vehicle configuration data comprising at least a control program and control parameters to enable said local control device to operate, said volatile memory means erasing its contents when it loses electric power, said method comprising the steps of:

supplying continuous electric power to said at least one of said local control devices while it remains installed in the vehicle, including when the vehicle is stationary and when the engine is not running; and providing a separate resident control program contained in said at least one of said local control devices, which resident control program is operative in response to detection of a nonprogrammed state of said volatile memory of said at least one of said local control devices, in which nonprogrammed state said volatile memory contains no program steps or data, and in response to detection of said nonprogrammed state said resident control program initializes the central control device to automatically transfer said vehicle configuration data from its vehicle configuration memory, via said data bus, and can store said vehicle configuration data in said volatile memory.

7. Method according to claim 6 wherein:

said retrofitted or replaced control device initiates a comparison of data stored in a memory thereof with vehicle configuration data stored in the vehicle configuration memory of the central control device; and if said comparison detects differences between the data which are compared, said retrofitted or replaced control device initiates an overwriting of data stored in the memory of the retrofitted or replaced control device with vehicle configuration data transmitted from the vehicle configuration memory.

* * * * *